United States Patent [19]

Reesman

[11] 4,013,802
[45] Mar. 22, 1977

[54] CORN FLAKE PROCESS AND PRODUCT
[75] Inventor: Stanley H. Reesman, Battle Creek, Mich.
[73] Assignee: General Foods Corporation, White Plains, N.Y.
[22] Filed: May 21, 1975
[21] Appl. No.: 579,355
[52] U.S. Cl. .............................. 426/621; 426/466; 426/457
[51] Int. Cl.² ....................................... A23L 1/164
[58] Field of Search ............ 426/625, 96, 560, 621, 426/450, 457

[56] References Cited
UNITED STATES PATENTS
1,161,323 11/1915 Martin et al. ...................... 426/621
1,189,134 6/1916 Kellogg .............................. 426/621
1,321,754 11/1919 Kellogg .............................. 426/621
1,925,267 9/1933 McKay ............................... 426/621
2,011,050 8/1935 Greenwood ....................... 426/457

Primary Examiner—Raymond N. Jones
Attorney, Agent, or Firm—Bruno P. Struzzi; Thomas V. Sullivan; Mitchell D. Bittman

[57] ABSTRACT

Corn grits are treated in a hot, humid atmosphere prior to flaking in order to produce a cereal particle which can be readily flaked and which when toasted has a blistered surface that does not go prematurely soft in milk.

12 Claims, No Drawings

CORN FLAKE PROCESS AND PRODUCT

BACKGROUND OF THE INVENTION

Corn flakes are generally produced from grits by processing over a long cooking, drying and tempering procedure preparatory to flaking. The toasted flake product often lacks a bubbly surface and goes soft in milk rapidly. The flakes themselves may be poor in quality by reason of the fact that the grits from which they are derived are hard and as a consequence texture and appearance of the flake is not consistent.

It is an object of the invention to provide a toasted flake product and process which characteristically produces a bubbly, blistered surface and remains desirably crisp when wetted in milk or cream.

It is a further object of this invention to shorten the required drying time preparatory to tempering and also to eliminate the tempering step entirely or at least reduce it while at the same time providing a uniform and consistently blistered surface which has a a friable texture and is more readily produced on flaking rolls.

Other processing attributes will be apparent from the accompanying description of the invention which overcomes limitations of the prior art in manufacturing toasted flake products.

STATEMENT OF THE INVENTION

The present invention is founded on the finding that hard cooked grits when treated in a hot, humid atmosphere are plasticized and more pliable and more conducive to flaking such that a more blistered uniform flake is obtained. This finding permits a reduction in the required period for tempering preparatory to flaking.

DETAILED DESCRIPTION OF THE INVENTION

Corn grits with syrup are cooked in a conventional manner in a rotary cooker at 15 to 20 pounds per square inch gauge for 2 to 3½ hours. At this point the novel aspects of the invention may be employed in that the grits may be treated for a reduced period of time, generally less than 45 minutes and typically less than 30 minutes, by regulating humidity and air speed in a humid gaseous atmosphere of 120° F–300° F, a forced air dryer being typically employed with variable air velocity in a static or fluid bed-type; preferably the treating air has a humidity of at least 50% to assure the intended effects. As a result of this treatment, there may be a moderate uniform dehydration of the grits. At this point, the grit may be at a moisture content typically of about 15%, 12% to 20% being a broader range.

Following this humid gas treatment, the partially dried grits may preferably be tempered at ambient room temperature conditions for a period of less than 1 hour and typically 30–45 minutes in order to assure uniform distribution of moisture throughout the grits. This tempering period is advantageously compared with the protracted tempering that is necessary in customary art wherein grits that have bene previously dried over a number of hours and have a case-hardened surface are necessarily held in tempering bins for periods of 4–8 hours.

Following tempering, the grits are rolled into flakes, grit temperature being 120°–160° F or above at this point. Using the above-specified temperatures, the grits are sufficiently plastic that they may be easily flaked and an attractive, unfractured product consistently with lessened wear on the flaking rolls.

The flaked product is then toasted to a brown color, either under conventional toasting temperatures and conditions using an oven at 300°–340° F or using a fluid bed toasting technique and sufficient fluidizing gas at toasting caramelizing temperatures, say in the range of 300°–400° F more commonly 350°–400° F. The toasted products have a consistent overall blistering surface.

Whereas the invention has been referred to in its preferred practice as employing a tempering step of up to 30 minutes preparatory to flaking, the grits can be flaked without tempering and immediately after the humid heating operation to like advantage.

The utility of this processing feature is that flake surface and texture can be more readily controlled by modifying the duration of the tempering step and the grit temperature itself can be more readily controlled. Humid air, in effecting these improvements, is believed to create a uniform plasticity stemming from the redistribution of the water throughout the grits. The practice of humidification may reduce the moisture content only a minimal extent such that product leaving a treating zone may be no more than 178 % less in moisture content than entering it depending upon the extent of cooking of the grits. In general, therefore, although the humidification may also involve some dehydration, its principal function involves redistribution of moisture content present through a partial control of the surface characteristics of the grit so as to limit case-hardening thereof, although some limited case hardening is experienced.

The temperature of this humid hot atmosphere in the case of a forced air draft will be 175°–225° F dry bulb, 125°–175° F wet bulb. Commonly, the duration of any treatment will be only a matter of less than 5 minutes, typically 1 to 2 minutes as a result of which grit temperatures will commonly be in the range of 120°–165° F or even higher preparatory to flaking and toasting.

EXAMPLE I

Two hundred pounds of grits are cooked by admixture with sufficient water, sugar, malt syrup and salt to produce a fully cooked soft, pliable cereal of 24% moisture. The cooked grits are dried for 2½ hours in a vertical dryer and then tempered in tempering bins for 7 hours as a result of which the moisture content is reduced to approximately 14%. The grits are then heated in the humid zone of a forced air gas-fired Proctor and Schwartz cabinet dryer, the temperature of the grits before entering the dryer is about 100° F and after humid air treatment is 152° + 5°; oven setting is 200° F dry bulb, 175° F wet bulb for 2 minutes. No substantial change in moisture is detected. The result is a plasticizing of the previously dried and tempered grit.

The thus treated grits in this condition are flaked and toasted to the intended brown color in a conventional toasting oven operating at 300°–400° F to produce a browned crisp product of 2% moisture. Product is well blistered. The flaked toasted product can be consumed dry or coated with a surgar-coating which may or may not contain vitamins, minerals and the usual supplements. When the product is consumed in milk it remains desirably crisp of a period of about 4 minutes.

EXAMPLE II

The cooked corn grits need not be humidified and heated as in Example I, but rather may be charged into a multi-pass traveling screen dryer with regulated humidity and air speed for a period of 30 minutes, thereby considerably shortening the drying period preparatory to further treatment. The resultant grit are of 15% moisture and have a temperature of 150° F. A uniform plasticity and distribution of moisture in the grit is provided. Thereafter, in lieu of an overt tempering step of Example I, the partially dried grits may simply be charged to the feed hopper of the flaking rolls wherein they will be held for 30–45 minutes and during which some tempering occurs, a substantially less period than that practiced in the prior art in effect. This practice eliminates the necessity for large tempering bins wherein dried grits are stored for a matter of hours prior to flaking. The grits are flaked at a temperature of about 130° F and yet art of sufficient plasticity to be flaked without undue fracture or roll wear. The flaked grits are then toasted in a fluidized bed dryer at an air temperature of 350°–400° F with varying air velocity for 22–30 seconds or until a toasted brown color and a flake moisture of about 2½% is obtained. The resulting flakes will have a uniform blistering and will remain desirably crisp as in Example I when wetted in milk.

Those skilled in the art will recognize that variations from the foregoing specified best modes may be practiced within the skill of the calling. Thus, conditions can be changed to alter the curling or undulations that are manifested in the flake product consistent with intended quality specifications. In general, however, these art practices will involve an overall abreviation of the plant practices required to product a crisp, friable blistered corn flake, particularly in those steps or operations which call for hold-up times in either the drying or the tempering zones or both.

What is claimed is:

1. In the art of producing corn flakes from corn grits which have been cooked and wherein the cooked grits are flaked and toasted to produce a blistered appearance, the improvement which comprises subjecting said cooked grits to a humid gaseous atmosphere having a tenperature of about 120° F–300° F for a period of time effective to produce a grit temperature of at least 120° F and to plasticize the grits preparatory to flaking.

2. The process of claim 1 wherein the grits are tempered preparatory to flaking.

3. The process of claim 2 wherein the grits are charged to a zone of controlled heat and humidity having a wet bulb temperature of at least 125° F.

4. The process of claim 3 wherein the grits are charged to the zone operative to partially dry the grits.

5. The process of claim 4 wherein said zone has a relative humidity of at least 50%.

6. The process of claim 1 wherein the grits are charged to a forced air humid heat source having a temperature of 175°–225° F D.B. and 125°–175° F. W.B.

7. The process of claim 6 wherein said grits are partially dried as a result of treatment in said zone.

8. The process of claim 1 wherein said flaked grits are oven toasted.

9. The process of claim 1 wherein said flaked grits are fluidized bed toasted.

10. The process of claim 1 wherein said cooked grits are tempered in a zone of regulated humidity and air speed for a period not exceeding 30 minutes.

11. The process of claim 10 wherein the humidity-conditioned grits are tempered for a period of less than 45 minutes and are thereafter flaked at a grit temperature exceeding 120° F.

12. The product of the process of claim 1.

* * * * *

UNITED STATES PATENT AND TRADEMARK OFFICE
CERTIFICATE OF CORRECTION

PATENT NO. : 4,013,802
DATED : March 22, 1977
INVENTOR(S) : Stanley H. Reesman

It is certified that error appears in the above-identified patent and that said Letters Patent are hereby corrected as shown below:

Column 1, line 61, delete "bene" and insert in its place
-- been --.

Column 2, line 1, after "and" and before "an" insert
-- make --; line 24, delete "178" and insert in its place
-- 1/2 --; line 61, delete "surgar" and insert in its place
-- sugar --.
Column 3, line 16, delete "art" and insert in its place
-- are --.

Signed and Sealed this

Twenty-fourth Day of May 1977

[SEAL]

Attest:

RUTH C. MASON
*Attesting Officer*

C. MARSHALL DANN
*Commissioner of Patents and Trademarks*